US010455322B2

(12) United States Patent
Garner et al.

(10) Patent No.: US 10,455,322 B2
(45) Date of Patent: Oct. 22, 2019

(54) REMOTE CONTROL WITH PRESENCE SENSOR

(71) Applicant: Roku, Inc., Los Gatos, CA (US)

(72) Inventors: Gregory Mack Garner, Springdale, AZ (US); Ali Vassigh, San Jose, CA (US); Soren Riise, San Jose, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 15/962,478

(22) Filed: Apr. 25, 2018

(65) Prior Publication Data
US 2019/0058942 A1 Feb. 21, 2019

Related U.S. Application Data

(60) Provisional application No. 62/547,471, filed on Aug. 18, 2017.

(51) Int. Cl.
*H04R 3/00* (2006.01)
*H04R 1/40* (2006.01)
(Continued)

(52) U.S. Cl.
CPC .............. *H04R 1/406* (2013.01); *G01S 3/802* (2013.01); *G01S 3/805* (2013.01); *G01S 3/8083* (2013.01);
(Continued)

(58) Field of Classification Search
CPC .................................................... H04R 3/00
See application file for complete search history.

(56) References Cited

U.S. PATENT DOCUMENTS 7,072,686 B1     7/2006   Schrager
9,689,960 B1 *   6/2017   Barton .................. G01S 3/8083
(Continued)

FOREIGN PATENT DOCUMENTS

WO    WO 2015/041892 A1    3/2015
WO    WO 2016/032021 A1    3/2016

OTHER PUBLICATIONS

International Search Report and Written Opinion of the International Searching Authority for International Application No. PCT/US17/50629, dated Sep. 27, 2017 (14 pages).
(Continued)

*Primary Examiner* — Olisa Anwah
(74) *Attorney, Agent, or Firm* — Sterne, Kessler, Goldstein & Fox, P.L.L.C.

(57) ABSTRACT

Disclosed herein are system, apparatus, article of manufacture, method and/or computer program product embodiments, and/or combinations and sub-combinations thereof, for controlling functions of an audio responsive electronic device based on a presence detector (e.g., a motion sensor) to improve power usage and functional performance. In some embodiments, an audio responsive electronic device operates to intelligently turn on and turn off components in response to the detected presence of a user. In some embodiments, an audio responsive electronic device operates to suppress noise from the display device (or other sources of noise), and enhance audio commands from a user (or other sources of audio commands). In some embodiments, a media device is configured to adjust a transmission pattern to an audio responsive electronic device based on user position.

18 Claims, 11 Drawing Sheets

(51) Int. Cl.
*G01S 3/808* (2006.01)
*G01S 3/86* (2006.01)
*G01S 3/805* (2006.01)
*G01S 3/802* (2006.01)
*G01V 1/00* (2006.01)
*G01S 5/16* (2006.01)
*G01S 5/18* (2006.01)
*H04M 1/72* (2006.01)

(52) U.S. Cl.
CPC ............... *G01S 3/86* (2013.01); *G01S 5/16* (2013.01); *G01S 5/18* (2013.01); *G01V 1/00* (2013.01); *H04M 1/72* (2013.01); *H04R 3/005* (2013.01)

(56) References Cited

U.S. PATENT DOCUMENTS

| | | | |
|---|---|---|---|
| 9,721,570 | B1 | 8/2017 | Beal et al. |
| 9,729,994 | B1 | 8/2017 | Eddins et al. |
| 2004/0066941 | A1 | 4/2004 | Amada et al. |
| 2007/0291956 | A1 | 12/2007 | Loether |
| 2007/0296701 | A1* | 12/2007 | Pope ............ G06F 1/3215 345/168 |
| 2008/0154613 | A1* | 6/2008 | Haulick ............ B60R 25/257 704/275 |
| 2009/0138507 | A1 | 5/2009 | Burckart et al. |
| 2009/0243909 | A1* | 10/2009 | Reams ............ G06F 1/3203 341/173 |
| 2010/0333163 | A1 | 12/2010 | Daly |
| 2011/0261950 | A1 | 10/2011 | Yamaguchi |
| 2012/0062729 | A1 | 3/2012 | Hart et al. |
| 2012/0128176 | A1 | 5/2012 | Acero et al. |
| 2012/0146788 | A1* | 6/2012 | Wilson ............ G08B 13/187 340/539.23 |
| 2012/0185247 | A1 | 7/2012 | Tzirkel-Hancock et al. |
| 2012/0224714 | A1 | 9/2012 | Couse et al. |
| 2013/0147770 | A1* | 6/2013 | Dahl ............ G06F 1/3215 345/177 |
| 2013/0238326 | A1 | 9/2013 | Kim et al. |
| 2014/0222436 | A1 | 8/2014 | Binder et al. |
| 2014/0278437 | A1* | 9/2014 | Shen ............ G10L 21/06 704/275 |
| 2014/0309993 | A1 | 10/2014 | Goussard |
| 2014/0337016 | A1 | 11/2014 | Herbig et al. |
| 2015/0018992 | A1 | 1/2015 | Griffiths et al. |
| 2015/0036573 | A1* | 2/2015 | Malik ............ H04W 52/0254 370/311 |
| 2015/0100322 | A1* | 4/2015 | Lee ............ H04N 5/4403 704/275 |
| 2015/0194152 | A1 | 7/2015 | Katuri et al. |
| 2015/0296289 | A1 | 10/2015 | Lakkundi et al. |
| 2015/0373393 | A1 | 12/2015 | Lee et al. |
| 2016/0071513 | A1 | 3/2016 | Sun et al. |
| 2016/0099007 | A1 | 4/2016 | Alvarez et al. |
| 2016/0148614 | A1 | 5/2016 | Poon et al. |
| 2016/0150472 | A1 | 5/2016 | Poon et al. |
| 2016/0192069 | A1 | 6/2016 | McIntosh et al. |
| 2016/0212488 | A1 | 7/2016 | Os et al. |
| 2016/0322047 | A1 | 11/2016 | Kawashima et al. |
| 2017/0011742 | A1 | 1/2017 | Jing et al. |
| 2017/0133011 | A1 | 5/2017 | Chen et al. |
| 2017/0206896 | A1 | 7/2017 | Ko et al. |
| 2017/0243576 | A1 | 8/2017 | Millington et al. |
| 2017/0245076 | A1* | 8/2017 | Kusano ............ H04R 3/00 |
| 2017/0286049 | A1 | 10/2017 | Kim et al. |
| 2017/0289678 | A1* | 10/2017 | Melanson ............ H04R 19/04 |
| 2018/0025001 | A1* | 1/2018 | Patel ............ G06F 17/30017 |
| 2018/0025733 | A1* | 1/2018 | Qian ............ G10L 17/22 704/275 |
| 2018/0077233 | A1* | 3/2018 | Chang ............ H04L 67/1048 |
| 2018/0122373 | A1 | 5/2018 | Gamer et al. |

OTHER PUBLICATIONS

International Search Report and Written Opinion of the international Searching Authority for International Application No. PCT/US2018/041402, dated Oct. 4, 2018 (6 pages).
International Search Report and Written Opinion of the International Searching Authority for International Application No. PCT/US2018/048104, dated Dec. 17, 2018 (10 pages).
International Search Report and Written Opinion of the International Searching Authority for International Application No. PCT/US2018/048101, dated Dec. 18, 2018 (14 pages).
International Search Report and Written Opinion of the International Searching Authority for International Application No, PCT/U52018/048106, dated Jan. 16, 2019 (10 pages).
International Search Report and Written Opinion of the International Searching Authority for International Application No. PCT/US2018/000260, dated Jan. 3, 2019 (14 pages).

* cited by examiner

REMOTE CONTROL WITH PRESENCE SENSOR

CROSS-REFERENCE TO RELATED APPLICATIONS

The present application claims benefit of provisional U.S. Patent Application No. 62/547,471, titled "Remote Control with Presence Sensor" filed on Aug. 18, 2017, which is incorporated herein by reference in its entirety.

This application is related to U.S. patent application Ser. No. 15/341,552 titled "Improved Reception Of Audio Commands," filed Nov. 2, 2016, and U.S. patent application Ser. No. 15/646,379 titled "Visual Display Of Status When Pairing Audio Remote With Non-Native Digital Assistant," filed Jul. 11, 2017, which are herein incorporated by reference in their entireties.

BACKGROUND

Field

This disclosure is generally directed to controlling functions of a remote control based on a presence sensor in order to improve power usage and functional performance.

Background

Remote control devices, including universal remote controls, audio responsive remote controls, cell phones, and personal digital assistants (PDAs), to name just a few examples, are typically powered by a remote power supply, such as a battery or power cell. It is desirable to maximize the time that a remote control device may operate before its power supply must be replaced or recharged. But the functionality of and demands on remote control devices have increased through the years. For example, an audio responsive remote control device may send audio data to, and receive audio data from, a media device such as a set top box. This may require a higher bandwidth connection to the media device. For example, the remote control device may connect to the media device using a wireless network connection such as Institute of Electrical and Electronics Engineers (IEEE) 802.11 ac. The increased functionality and demands require greater power consumption, which results in greater power supply demand and reduced convenience and reliability because of the shorter intervals required between replacing or recharging batteries.

Remote control devices may use various power management strategies to minimize power usage. For example, a remote control device may turn off a wireless network interface in response to a period of user inaction. Similarly, an audio responsive remote control device may turn off a microphone in response to a period of user inaction.

But while these power management strategies may minimize power usage, they may also decrease user satisfaction. For example, a user may not be able to immediately issue commands using the remote control device because its wireless network interface may be turned off. Similarly, a user may not be able to immediately issue voice commands to an audio responsive remote control because its microphone is turned off. This lack of responsiveness decreases user satisfaction.

Moreover, the increased functionality and demands required of remote control devices means additional reliability and performance issues. For example, a remote control device may use a wireless network connection to stream large amounts of data from a media device. But the wireless network connection may become disconnected or encounter interference which undermines the use of such functionality. Similarly, a user may issue a voice command to an audio responsive remote control which may send a corresponding command to a media device. This may improve user interaction with the media device. But the audio responsive remote control may process the voice command incorrectly because of the presence of background noise that negatively impacts the ability of the audio responsive remote control to clearly receive and recognize the voice command. This may prevent the audio responsive remote control from performing the voice command, or may cause the audio responsive remote control to perform the incorrect command.

SUMMARY

Provided herein are system, apparatus, article of manufacture, method and/or computer program product embodiments, and/or combinations and sub-combinations thereof, for controlling functions of a remote control based on a presence detector (e.g., a motion sensor) to improve power usage and functional performance. Some embodiments operate to intelligently activate and deactivate components of a remote control in response to the presence of a user. Some embodiments operate to intelligently activate and deactivate components of a display device in response to the presence of a user. Some embodiments operate to suppress noise from the display device (or other sources of noise), and enhance audio commands from a user (or other sources of audio commands). Some embodiments operate to adjust a transmission pattern to a remote control based on user position.

While embodiments are described with respect to the example of controlling a remote control device in a media streaming environment, these embodiments are applicable to the control of any electronic devices in any environment.

This Summary is provided merely for purposes of illustrating some example embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
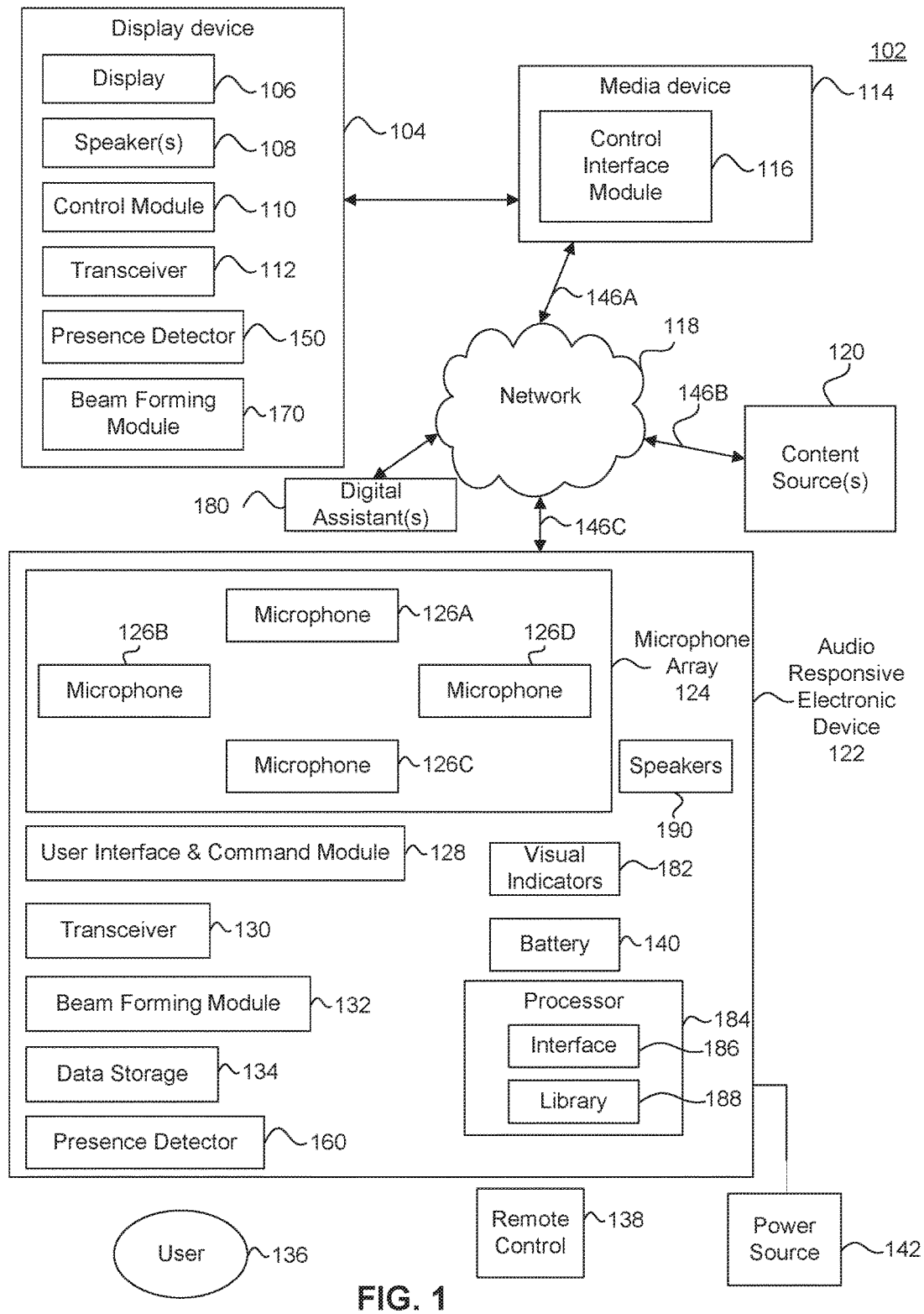
FIG. 1 illustrates a block diagram of a data processing system that includes an audio responsive electronic device, according to some embodiments.

FIG. 1 illustrates a block diagram of a data processing system 102, according to some embodiments. In a non-limiting example, data processing system 102 is a media or home electronics system 102.

The media system 102 may include a display device 104 (e.g. monitors, televisions, computers, phones, tablets, projectors, etc.) and a media device 114 (e.g. streaming devices, multimedia devices, audio/video playback devices, etc.). In some embodiments, the media device 114 can be a part of, integrated with, operatively coupled to, and/or connected to display device 104. The media device 114 can be configured to communicate with network 118. In various embodiments, the network 118 can include, without limitation, wired and/or wireless intranet, extranet, Internet, cellular, Bluetooth and/or any other local, short range, ad hoc, regional, global communications network, as well as any combination thereof.

The media system 102 also includes one or more content sources 120 (also called content servers 120). Content sources 120 may each store music, videos, movies, TV programs, multimedia, images, still pictures, text, graphics, gaming applications, advertisements, software, and/or any other content in electronic form.

The media system 102 may include a user 136 and a remote control 138. Remote control 138 can be any component, part, apparatus or method for controlling media device 114 and/or display device 104, such as a remote control, a tablet, laptop computer, smartphone, on-screen controls, integrated control buttons, or any combination thereof, to name just a few examples.

The media system 102 may also include an audio responsive electronic device 122. In some embodiments herein, the audio responsive electronic device 122 is an audio remote control device. Audio responsive electronic device 122 may receive audio commands from user 136 or another source of audio commands (such as but not limited to the audio of content output by speaker(s) 108 of display device 104). Audio responsive electronic device 122 may transmit control signals corresponding to such audio commands to media device 114, display device 104, digital assistant(s) 180 and/or any other component in system 102, to cause the media device 114, display device 104, digital assistant(s) 180 and/or other component to operate according to the audio commands.

The display device 104 may include a display 106, speaker(s) 108, a control module 110, transceiver 112, presence detector 150, and beam forming module 170. Control module 110 may receive and respond to commands from media device 114, remote control 138 and/or audio responsive electronic device 122 to control the operation of display device 104, such as selecting a source, varying audio and/or video properties, adjusting volume, powering on and off, to name just a few examples. Control module 110 may receive such commands via transceiver 112. Transceiver 112 may operate according to any communication standard or technique, such as infrared, cellular, WIFI, Blue Tooth, to name just a few examples. Transceiver 112 may comprise a plurality of transceivers. The plurality of transceivers may transmit data using a plurality of antennas. For example, the plurality of transceivers may use multiple input multiple output (MIMO) technology.

Presence detector 150 may detect the presence, or near presence of user 136. Presence detector 150 may further determine a position of user 136. For example, presence detector 150 may detect user 136 in a specific quadrant of a room such as a living room. Beam forming module 170 may adjust a transmission pattern of transceiver 112 to establish and maintain a peer to peer wireless network connection to audio responsive electronic device 122.

In some embodiments, presence detector 150 may be a motion sensor, or a plurality of motion sensors. The motion sensor may be passive infrared (PIR) sensor that detects motion based on body heat. The motion sensor may be passive sensor that detects motion based on an interaction of radio waves (e.g., radio waves of the IEEE 802.11 standard) with a person. The motion sensor may be microwave motion sensor that detects motion using radar. For example, the microwave motion sensor may detect motion through the principle of Doppler radar. The motion sensor may be an ultrasonic motion sensor. The motion sensor may be a tomographic motion sensor that detects motion by sensing disturbances to radio waves as they pass from node to node in a wireless network. The motion sensor may be video camera software that analyzes video from a video camera to detect motion in a field of view. The motion sensor may be a sound sensor that analyzes sound from a microphone to detect motion in the surrounding area. As would be appreciated by a person of ordinary skill in the art, the motion sensor may be various other types of sensors, and may use various other types of mechanisms for motion detection or presence detection now known or developed in the future.

In some embodiments, display device 104 may operate in standby mode. Standby mode may be a low power mode. Standby mode may reduce power consumption compared to leaving display device 104 fully on. Display device 104 may also exit standby mode more quickly than a time to perform a full startup. Standby mode may therefore reduce the time a user may have to wait before interacting with display device 104.

In some embodiments, display device 104 may operate in standby mode by turning off one or more of display 106, speaker(s) 108, control module 110, and transceiver 112. The turning off of these one or more components may reduce power usage. In some embodiments, display device 104 may keep on control module 110 and transceiver 112 in standby mode. This may allow display device 104 to receive input from user 136, or another device, via control module 110 and exit standby mode. For example, display device 104 may turn on display 104 and speaker(s) 108 upon exiting standby mode.

In some embodiments, display device 104 may keep on presence detector 150 in standby mode. Presence detector 150 may then monitor for the presence, or near presence, of user 136 by display device 104. In some embodiments, presence detector 150 may cause display device 104 to exit standby mode when presence detector 150 detects the presence, or near presence, of user 136 by display device 104. This is because the presence of user 136 by display device 104 likely means user 136 will be interested in viewing and issuing commands to display device 104.

In some embodiments, presence detector 150 may cause display device 104 to exit standby mode when presence detector 150 detects user 136 in a specific location. In some embodiments, presence detector 150 may be a passive infrared motion sensor that detects motion at a certain distance and angle. In some other embodiments, presence detector 150 may be a passive sensor that detects motion at a certain distance and angle based on an interaction of radio waves (e.g., radio waves of the IEEE 802.11 standard) with a person (e.g., user 136). This determined distance and angle may indicate user 136 is in a specific location. For example, presence detector 150 may detect user 136 being in a specific quadrant of a room. Similarly, presence detector 150 may detect user 136 being directly in front of display device 104. Determining user 136 is in a specific location may reduce the number of times presence detector 150 may inadvertently cause display device 104 to exit standby mode. For example, presence detector 150 may not cause display device 104 to exit standby mode when user 136 is not directly in front of display device 104.

In some embodiments, presence detector 150 may monitor for the presence of user 136 by display device 104 when display device 104 is turned on. Display device 104 may detect the lack of presence of user 136 by display device 104 at a current time using presence detector 150. Display device 104 may then determine the difference between the current time and a past time of a past user presence detection by presence detector 150. Display device 104 may place itself in standby mode if the time difference is greater than a period of time threshold. The period of time threshold may be user configured. In some embodiments, display device 104 may prompt user 136 via display 106 and or speaker(s) 108 to confirm user 136 is still watching and or listening to display device 104. In some embodiments, display device 104 may place itself in standby mode if user 136 does not respond to the prompt in a period of time.

Media device 114 may include a control interface module 116 for sending and receiving commands to/from display device 104, remote control 138 and/or audio responsive electronic device 122.

In operation, user 136 may use remote control 138 or audio responsive electronic device 122 to interact with media device 114 to select content, such as a movie, TV show or song. Media device 114 requests the selected content from content source(s) 120 over the network 118. Content source(s) 120 transmit the requested content to media device 114. Media device 114 transmits the content to display device 104 for playback using display 106 and/or speakers 108. User 136 may use remote control 138 or audio responsive electronic device 122 to change settings of display device 104, such as changing the volume, the source, the channel, display and audio settings, to name just a few examples.

In an embodiment, the user 136 may enter commands on remote control 138 by pressing buttons or using a touch screen on remote control 138, such as channel up/down, volume up/down, play/pause/stop/rewind/fast forward, menu, up, down, left, right, to name just a few examples.

In an embodiment, the user 136 may also or alternatively enter commands using audio responsive electronic device 122 by speaking a command. For example, to increase the volume, the user 136 may say "Volume Up." To change to the immediately preceding channel, the user 136 may say "Channel down." In an embodiment, the user 136 may say a trigger word before saying commands, to better enable the audio responsive electronic device 122 to distinguish between commands and other spoken words. For example, the trigger word may be "Command." In this case, to increase the volume, the user 136 may say "Command Volume Up." In an embodiment, there may be one or more trigger words that are recognized by audio responsive electronic device 122.

In some embodiments, the audio responsive electronic device 122 may include a microphone array 124 comprising one or more microphones 126. The audio responsive electronic device 122 may also include a user interface and command module 128, transceiver 130, beam forming module 132, data storage 134, and presence detector 160. The audio responsive electronic device 122 may further include visual indicators 182, speakers 190, and a processor or processing module 184 having an interface 186 and database library 188, according to some embodiments (further described below). In some embodiments, the library 188 may be stored in data storage 134.

In some embodiments, user interface and command module 128 may receive audio input via microphone array 124. The audio input may be from user 136, display device 104 (via speakers 108), or any other audio source in system 102. User interface and command module 128 may analyze the received audio input to recognize trigger words and commands, using any well known signal recognition techniques, procedures, technologies, etc. The user interface and command module 128 may generate command signals compatible with display device 104 and/or media device 114 corresponding to the recognized commands, and transmit such commands to display device 104 and/or media device 114 via transceiver 130, to thereby cause display device 104 and/or media device 114 to operate according to the commands. Transceiver 130 may operate according to any communication standard or technique, such as infrared, cellular, WIFI, Blue Tooth, to name just a few examples. Audio responsive electronic device 122 may be powered by a battery 140, or via an external power source 142 (such as AC power, for example).

In some embodiments, similar to presence detector 150 in display device 104, presence detector 160 in the audio responsive electronic device 122 may detect the presence, or near presence of a user. Presence detector 160 may further determine a position of a user. In some embodiments, presence detector 160 may be a passive infrared motion sensor that detects motion at a certain distance and angle. In some other embodiments, presence detector 160 may be a passive sensor that detects motion at a certain distance and angle based on an interaction of radio waves (e.g., radio waves of the IEEE 802.11 standard) with a person (e.g., user 136). This determined distance and angle may indicate user 136 is in a specific location. For example, presence detector 160 may detect user 136 in a specific quadrant of a room such as a living room. As would be appreciated by a person of ordinary skill in the art, remote control 138 may similarly include a presence detector 160.

In some embodiments, presence detector 160 may be a motion detector, or a plurality of motion sensors. The motion sensor may be passive infrared (PIR) sensor that detects motion based on body heat. The motion sensor may be passive sensor that detects motion based on an interaction of radio waves (e.g., radio waves of the IEEE 802.11 standard) with a person. The motion sensor may be microwave motion sensor that detects motion using radar. For example, the microwave motion sensor may detect motion through the principle of Doppler radar. The motion sensor may be an ultrasonic motion sensor. The motion sensor may be a tomographic motion sensor that detects motion by sensing disturbances to radio waves as they pass from node to node in a wireless network. The motion sensor may be video camera software that analyzes video from a video camera to detect motion in a field of view. The motion sensor may be a sound sensor that analyzes sound from a microphone to detect motion in the surrounding area. As would be appreciated by a person of ordinary skill in the art, the motion sensor may be various other types of sensors, and may use various other types of mechanisms for motion detection or presence detection now known or developed in the future.

In some embodiments, similar to display device 104, audio responsive electronic device 122 may operate in standby mode. Standby mode may be a low power mode. Standby mode may reduce power consumption compared to leaving audio responsive electronic device 122 fully on. Audio responsive electronic device 122 may also exit standby mode more quickly than a time to perform a full startup. Standby mode may therefore reduce the time user 136 may have to wait before interacting with audio responsive electronic device 122.

In some embodiments, audio responsive electronic device 122 may operate in standby mode by turning off one or more of microphone array 124, user interface and command module 128, transceiver 130, beam forming module 132, data storage 134, visual indicators 182, speakers 190, and processing module 184. The turning off of these one or more components may reduce power usage. In some embodiments, audio responsive electronic device 122 may keep on microphone array 124 and or transceiver 130 in standby mode. This may allow audio responsive electronic device 122 to receive input from user 136, or another device, via microphone array 124 and or transceiver 130 and exit standby mode. For example, audio responsive electronic device 122 may turn on user interface and command module 128, beam forming module 132, data storage 134, visual indicators 182, speakers 190, and processing module 184 upon exiting standby mode.

In some other embodiments, audio responsive electronic device 122 may keep on presence detector 160, and turn off all other components in standby mode. Presence detector 160 may then monitor for the presence, or near presence, of user 136 by audio responsive electronic device 122. In some embodiments, presence detector 160 may cause audio responsive electronic device 122 to exit standby mode when presence detector 160 detects the presence, or near presence, of user 136 by audio responsive electronic device 122. This is because the presence of user 136 by audio responsive electronic device 122 likely means user 136 will be interested in interacting with audio responsive electronic device 122.

In some embodiments, presence detector 160 may cause audio responsive electronic device 122 to exit standby mode when presence detector 160 detects user 136 in a specific location. For example, presence detector 160 may detect user 136 being in a specific quadrant of a room. Similarly, presence detector 160 may detect user 136 within a threshold distance (e.g., 3 feet) of audio responsive electronic device 122. This may reduce the number of times presence detector 160 may inadvertently cause audio responsive electronic device 122 to exit standby mode. For example, presence detector 160 may not cause audio responsive electronic device 122 to exit standby mode when a user is not within a threshold distance of audio responsive electronic device 122.

In some embodiments, presence detector 160 may monitor for the presence of user 136 by audio responsive electronic device 122 when audio responsive electronic device 122 is turned on. Audio responsive electronic device 122 may detect the lack of presence of user 136 by audio responsive electronic device 122 at a current time using presence detector 160. Audio responsive electronic device 122 may then determine the difference between the current time and a past time of a past user presence detection by presence detector 160. Audio responsive electronic device 122 may place itself in standby mode if the time difference is greater than a period of time threshold. The period of time threshold may be user configured. In some embodiments, audio responsive electronic device 122 may prompt user 136 via visual indicators 182 and or speakers 190 to confirm user 136 does not plan to interact with audio responsive electronic device 122 in the near future. In some embodiments, audio responsive electronic device 122 may place itself in standby mode if user 136 does not respond to the prompt in a period of time. For example, audio responsive electronic device 122 may place itself in standby mode if user 136 does not click a button on, or issue a voice command to, audio responsive electronic device 122.

In some embodiments, audio responsive electronic device 122 may automatically turn off microphone array 124 after a period of time. This may reduce power consumption. In some embodiments, presence detector 160 may monitor for the presence of user 136 by audio responsive electronic device 122 when audio responsive electronic device 122 is turned on. Audio responsive electronic device 122 may detect the lack of presence of user 136 by audio responsive electronic device 122 at a current time using presence detector 160. Audio responsive electronic device 122 may then determine the difference between the current time and a past time of a past user presence detection by presence detector 160. Audio responsive electronic device 122 may turn off microphone array 124 if the time difference is greater than a period of time threshold. The period of time threshold may be user configured. In some embodiments, audio responsive electronic device 122 may prompt user 136 via visual indicators 182 and or speakers 190 to confirm user 136 is not present, or does not plan to issue voice commands to microphone array 124 in the near future. In some embodiments, audio responsive electronic device 122 may turn off microphone array 124 if user 136 does not respond to the prompt in a period of time. For example, audio responsive electronic device 122 may turn off microphone array 124 if user 136 does not click a button on, or issue a voice command to, audio responsive electronic device 122.

In some embodiments, audio responsive electronic device 122 may automatically turn on microphone array 124 after detecting the presence of user 136. In some embodiments, audio responsive electronic device 122 may turn on microphone array 124 when presence detector 150 detects user 136 in a specific location. For example, presence detector 160 may detect user 136 being in a specific quadrant of a room. Similarly, presence detector 160 may be a proximity detector that detects user 136 is within a threshold distance (e.g., 3 feet) of audio responsive electronic device 122. This may reduce the number of times presence detector 160 may inadvertently cause audio responsive electronic device 122 to turn on microphone array 124. For example, audio responsive electronic device 122 may not turn on microphone array 124 when user 136 is not within a threshold distance of audio responsive electronic device 122.

In some embodiments, audio responsive electronic device 122 may automatically turn on transceiver 130 after detecting the presence of user 136. In some embodiments, this may reduce the amount of time to setup a peer to peer wireless networking connection between the audio responsive electronic device 122 and display device 104. In some other embodiments, this may reduce the amount of time to setup a peer to peer wireless networking connection between the audio responsive electronic device 122 and media device 114. For example, audio responsive electronic device 122 may automatically establish setup, or reestablish, the peer to peer wireless networking connection in response to turning on transceiver 130. In some embodiments, audio responsive electronic device 122 may automatically send a keep alive message over the peer to peer wireless network connection to display device 104 after detecting the presence of user 136. The keep alive message may ensure that the peer to peer wireless network connection is not disconnected due to inactivity.

In some embodiments, audio responsive electronic device 122 may turn on transceiver 130 when presence detector 150 detects user 136 in a specific location. For example, presence detector 160 may detect user 136 being in a specific quadrant of a room. Similarly, presence detector 160 may detect user 136 within a threshold distance (e.g., 3 feet) of audio responsive electronic device 122. This may reduce the number of times presence detector 160 may inadvertently cause audio responsive electronic device 122 to turn on transceiver 130. For example, audio responsive electronic device 122 may not turn on transceiver 130 when user 136 is not within a threshold distance of audio responsive electronic device 122.

As would be appreciated by a person of ordinary skill in the art, other devices in system 102 may be placed in standby mode. For example, media device 102 may be placed in standby mode. For example, media device 102 may turn off control interface module 116 when being placed into standby mode. Moreover, as would be appreciated by a person of ordinary skill in the art, presence detector 150 or presence detector 160 may cause these other devices to enter and exit standby mode as described herein. For example, presence detector 150 or presence detector 160 may cause these other devices to turn on one or more components in response to detecting the presence of user 136. Similarly, presence detector 150 or presence detector 160 may cause these other devices to turn on one or more components in response to detecting user 136 in a specific location.

In some embodiments, display device 104 may establish a peer to peer wireless network connection with audio responsive electronic device 122 using transceiver 112. In some embodiments, the peer to peer wireless network connection may be WiFi Direct connection. In some other embodiments, the peer to peer wireless network connection may be a Bluetooth connection. As would be appreciated by a person of ordinary skill in the art, the peer to peer wireless network connection may be implemented using various other network protocols and standards.

In some embodiments, display device 104 may send commands to, and receive commands from, audio responsive electronic device 122 over this peer to peer wireless network connection. These commands may be intended for media device 114. In some embodiments, display device 104 may stream data from media device 104 to audio responsive electronic device 122 over this peer to peer wireless network connection. For example, display device 104 may stream music data from media device 104 to responsive electronic device 122 for playback using speaker(s) 190.

In some embodiments, display device 104 may determine the position of user 136 using presence detector 150, since user 136 may be considered to be at the same location as audio responsive electronic device 122. For example, presence detector 150 may detect user 136 being in a specific quadrant of a room.

In some embodiments, beam forming module 170 in display device 104 may use beam forming techniques on transceiver 112 to emphasize a transmission signal for the peer to peer wireless network connection for the determined position of the audio responsive electronic device 122. For example, beam forming module 170 may adjust the transmission pattern of transceiver 112 to be stronger at the position of the audio responsive electronic device 112 using beam forming techniques. Beam forming module 170 may perform this functionality using any well known beam forming technique, operation, process, module, apparatus, technology, etc.

Figure 2:
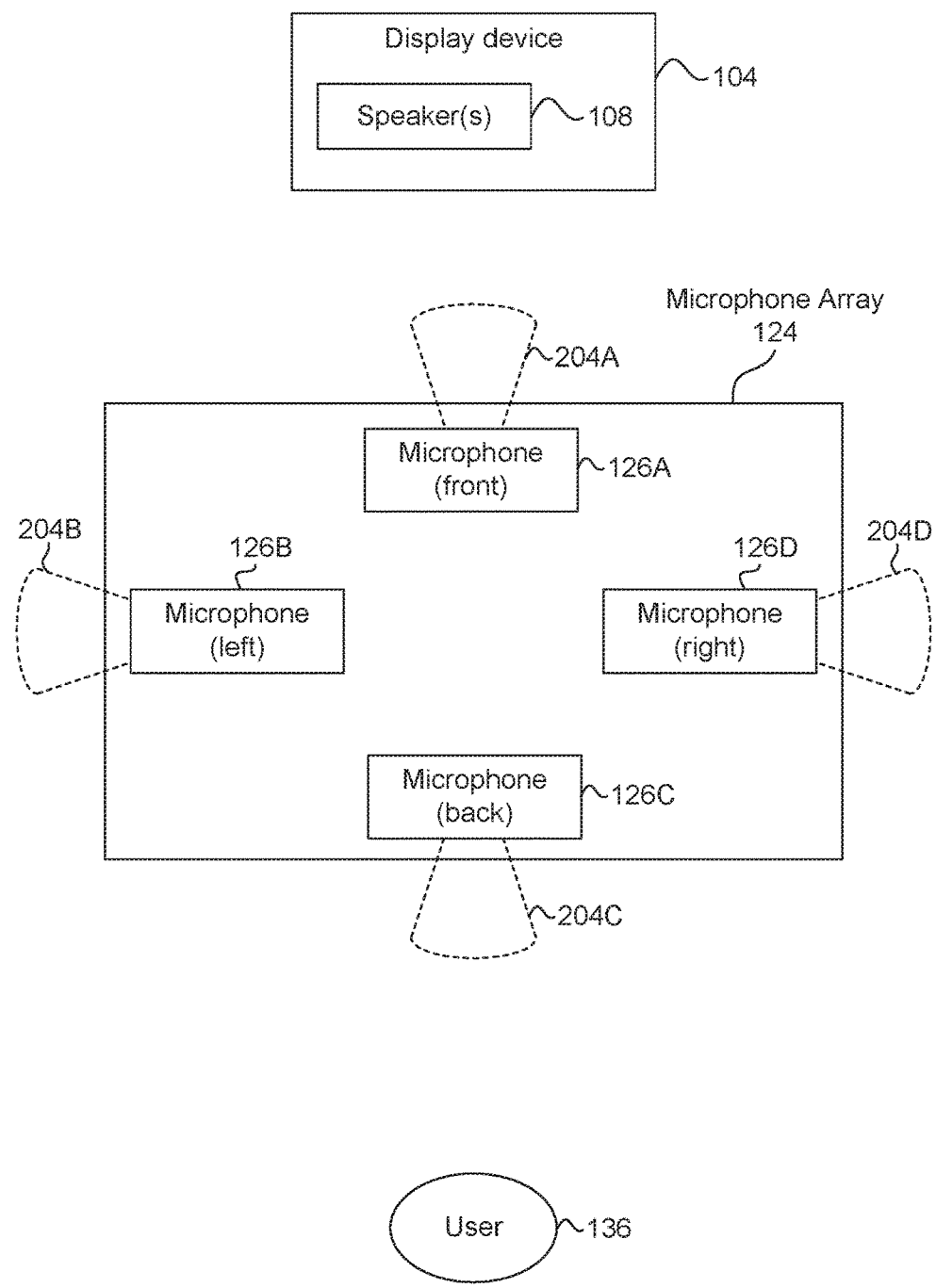
FIG. 2 illustrates a block diagram of a microphone array having a plurality of microphones, shown oriented relative to a display device and a user, according to some embodiments.

FIG. 2 illustrates a block diagram of microphone array 124 of the audio responsive electronic device 122, shown in an example orientation relative to the display device 104 and the user 136, according to some embodiments. In the example of FIG. 2, the microphone array 124 includes four microphones 126A-126D, although in other embodiments the microphone array 124 may include any number of microphones 126.

In the example of FIG. 2, microphones 126 are positioned relative to each other in a general square configuration. For illustrative purposes, and not limiting, microphone 126A may be considered at the front; microphone 126D may be considered at the right; microphone 126C may be considered at the back; and microphone 126B may be considered at the left. It is noted that such example designations may be set according to an expected or designated position of user 136 or display device 104, in some embodiments.

As shown in the example of FIG. 2, the user 136 is positioned proximate to the back microphone 126C, and the display device 104 is positioned proximate to the front microphone 126A.

Each microphone 126 may have an associated reception pattern 204. As will be appreciated by persons skilled in the relevant art(s), a microphone's reception pattern reflects the directionality of the microphone, that is, the microphone's sensitivity to sound from various directions. As persons skilled in the relevant art(s) will appreciate, some microphones pick up sound equally from all directions, others pick up sound only from one direction or a particular combination of directions.

In the example orientation of FIG. 2, the front microphone 126A receives audio from speakers 108 of display 104 most clearly, given its reception pattern 204A and relative to the other microphones 204B-204D. The back microphone 126C receives audio from user 136 most clearly, given its reception pattern 204C and relative to the other microphones 126A, 126B and 126D.

Enhancing Audio Capture from A User

Figure 3:
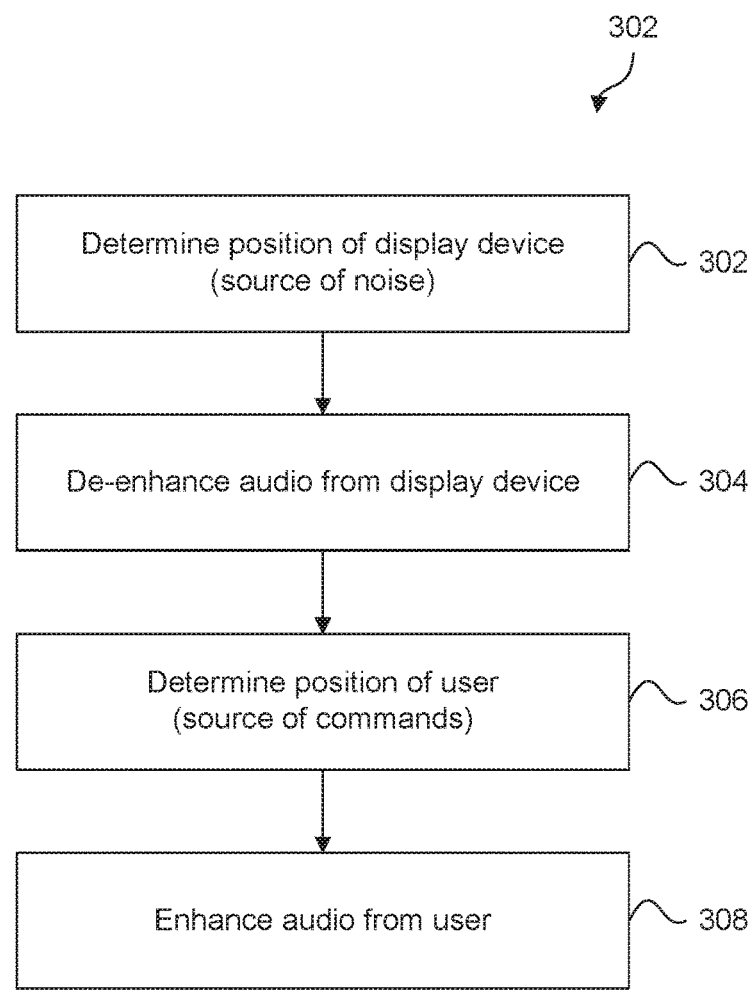
FIG. 3 illustrates a method for enhancing audio from a user and de-enhancing audio from a display device and/or other noise sources, according to some embodiments.

FIG. 3 illustrates a method 302 for enhancing audio from a user (and/or other sources of audio commands) and de-enhancing audio from a display device (and/or other noise sources), according to some embodiments. Method 302 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

For illustrative and non-limiting purposes, method 302 shall be described with reference to FIGS. 1 and 2. However, method 302 is not limited to those examples.

In 302, the position of a source of noise may be determined. For example, user interface and command module 128 of the audio responsive electronic device 122 may determine the position of display device 104. In embodiments, display device 104 may be considered a source of noise because audio commands may be expected from user 136 during times when display device 104 is outputting audio of content via speakers 108.

In some embodiments, display device 104 may determine the position of user 136 using presence detector 150, since user 136 may be considered to have the same position as audio responsive electronic device 122. Display device 104 may then transmit position information to audio responsive electronic device 122 that defines the relative position of display device 104 to user 136. In some embodiments, audio responsive electronic device 122 may determine the position of display device 104 based on this position information.

In some embodiments, user 136 may enter configuration settings specifying where the display device 104 is positioned proximate to one of the microphones 126 (such as the front microphone 126A in the example orientation of FIG. 2). Such configuration settings may be stored in data storage 134 of the audio responsive electronic device 122. Accordingly, in 302, user interface and command module 128 may access the configuration settings in data storage 134 to determine the position of display device 104.

In 304, audio from the source of noise may be de-enhanced or suppressed. For example, user interface and command module 128 may deactivate microphones 126 proximate to the display device 104 and having reception patterns 204 most likely to receive audio from display device 104. Specifically, in the example of FIG. 2, user interface and command module 128 may deactivate the front microphone 126A, and potentially also the right microphone 126D and/or the left microphone 126B.

Alternatively or additionally, beam forming module 132 in the audio responsive electronic device 122 may use beam forming techniques on any of its microphones 126 to de-emphasize reception of audio from the display device 104. For example, beam forming module 132 may adjust the reception pattern 204A of the front microphone 126A (and potentially also reception patterns 204D and 204B of the right microphone 126D and the left microphone 126) to suppress or even negate the receipt of audio from display device 104. Beam forming module 132 may perform this functionality using any well known beam forming technique, operation, process, module, apparatus, technology, etc.

Alternatively or additionally, user interface and command module 128 may issue a command via transceiver 130 to display device 104 to mute display device 104. In some embodiments, user interface and command module 128 may mute display device 104 after receiving and recognizing a trigger word. The user interface and command module 128 may operate in this manner, since user interface and command module 128 expects to receive one or more commands from user 136 after receiving a trigger word.

Figure 4:
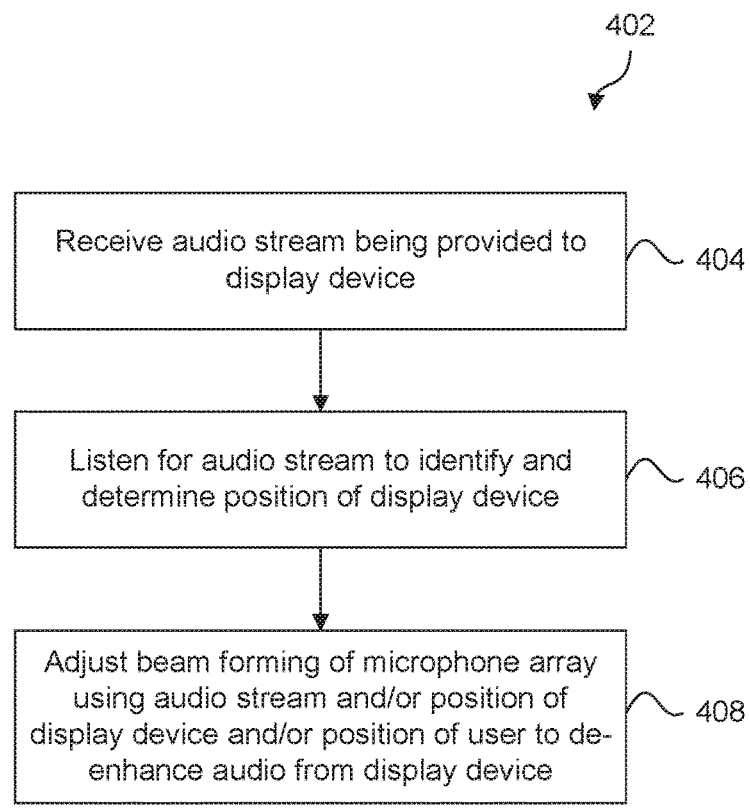
FIG. 4 illustrates a method for de-enhancing audio from a display device and/or other noise sources, according to some embodiments.

FIG. 4 illustrates an alternative or additional embodiment for implementing elements 302 and 304 in FIG. 3. In 404, user interface and command module 128 in the audio responsive electronic device 122 receives the audio stream of content being also provided to display device 104 from media device 114, for play over speakers 108. User interface and command module 128 may receive this audio stream from media device 114 via network 118 using, for example, WIFI, Blue Tooth, cellular, to name a few communication examples. User interface and command module 128 could also receive this audio stream from content source(s) 120 over network 118.

In 406, user interface and command module 128 may listen for audio received via microphone array 124 that matches the audio stream received in 404, using well known signal processing techniques and algorithms.

In 408, user interface and command module 128 may adjust the reception patterns 204 of those microphones 126 that received the matched audio stream, to suppress or even null audio reception of those microphones 126. For example, in 408, user interface and command module 128 may identify the microphones 126 where the signal amplitude (or signal strength) was the greatest during reception of the matched audio stream (such as the front microphone 126A in the example orientation of FIG. 2), and then operate with beam forming module 132 to suppress or null audio reception of those microphones 126 using well known beam forming techniques.

Alternatively or additionally, user interface and command module 128 in 408 may subtract the matched audio received in 406 from the combined audio received from all the microphones 126 in microphone array 124, to compensate for noise from the display device 104.

In some embodiments, the operations depicted in flowchart 402 are not performed when audio responsive electronic device 122 is powered by the battery 140 because receipt of the audio stream in 404 may consume significant power, particularly if receipt is via WIFI or cellular. Instead, in these embodiments, flowchart 402 is performed when audio responsive electronic device 122 is powered by an external source 142.

Referring back to FIG. 3, in 306, the position of a source of commands may be determined. For example, in some embodiments, user interface and command module 128 of the audio responsive electronic device 122 may determine the position of user 136, since user 136 may be considered to be the source of commands.

In some embodiments, audio responsive electronic device 122 may determine the position of user 136 using presence detector 160, since user 136 may be considered to be the source of commands. For example, presence detector 160 may detect user 136 being in a specific quadrant of a room.

In some embodiments, user 136 may enter configuration settings specifying the user 136 is the source of commands, and is positioned proximate to one of the microphones 126 (such as the back microphone 126C in the example orientation of FIG. 2). Accordingly, in 306, user interface and command module 128 may access the configuration settings in data storage 134 to determine the position of user 136.

In 308, audio from the source of commands may be enhanced. For example, user interface and command module 128 may enhance the audio sensitivity of microphones 126 proximate to the user 136 and having reception patterns 204 most likely to receive audio from user 136, using beam forming techniques. With regard to the example of FIG. 2, the user interface and command module 128 may use well known beam forming techniques to adjust the reception pattern 204C of back microphone 126C to enhance the ability of back microphone 126C to clearly receive audio from user 136.

Presence Sensor for Placing Display Device in a Standby Mode

Figure 5:
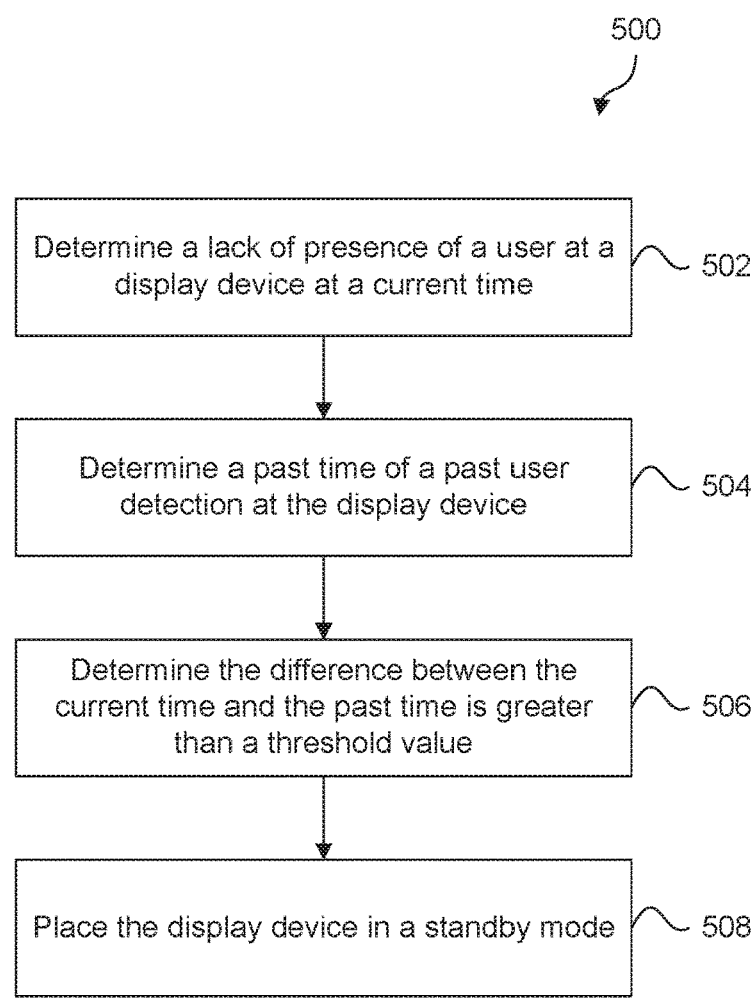
FIG. 5 illustrates a method for intelligently placing a display device in a standby mode, according to some embodiments.

FIG. 5 illustrates a method 500 for intelligently placing a display device in a standby mode, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

For illustrative and non-limiting purposes, method 500 shall be described with reference to FIG. 1. However, method 500 is not limited to that example.

In 502, display device 104 determines a lack of presence of user 136 at or proximate to display device 104 at a current time. For example, presence detector 150 of display device 104 may determine a lack of presence of user 136.

In 504, display device 104 determines a difference between the current time of 502 and a past time when a user was present. In some embodiments, presence detector 150 of display device 104 may have determined the past time when a user was present. In some other embodiments, display device 104 may have determined the past time when a user was present based on user interaction with display device 104.

In 506, display device 104 determines whether the difference of 504 is greater than a threshold value. In some embodiments, the threshold value may be user configured. In some other embodiments, the threshold value may be defined by display device 104.

In 508, display device 104 places itself in a standby mode in response to the determination that the difference of 506 is greater than the threshold value in 506. For example, display device 104 may turn off one or more of display 106, speaker(s) 108, control module 110, and transceiver 112. In some embodiments, display device 104 may prompt user 136 via display 106 and or speaker(s) 108 to confirm user 136 is still watching and or listening to display device 104. Display device 104 may place itself in standby mode if user 136 does not respond to the prompt within a period of time.

Presence Sensor for Placing Audio Remote Control in a Standby Mode

Figure 6:
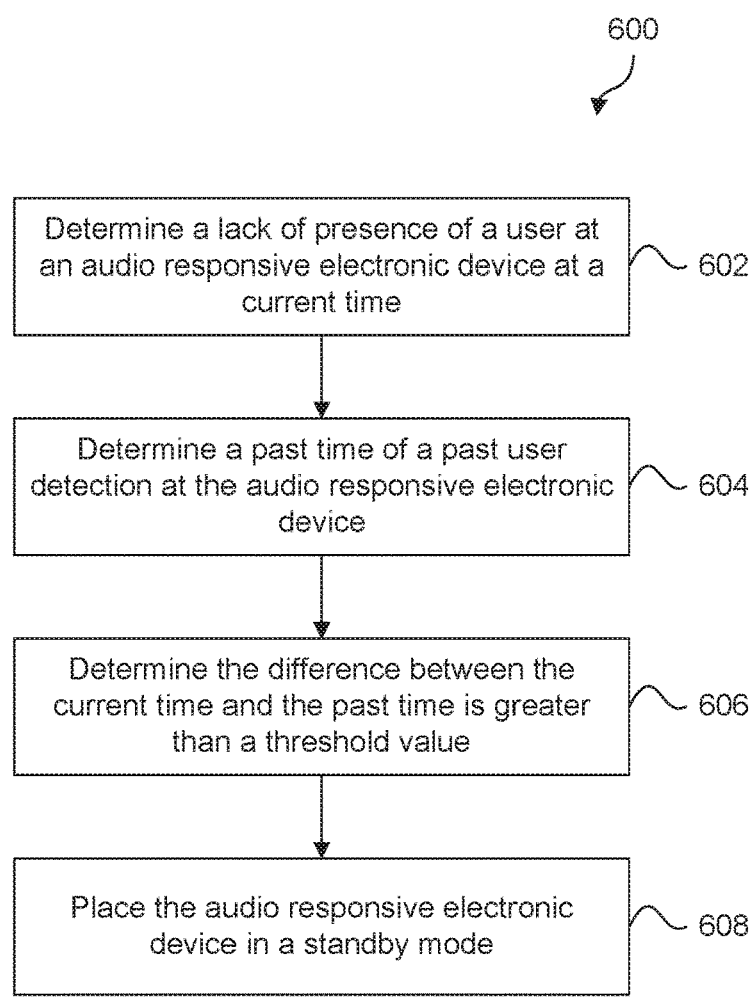
FIG. 6 illustrates a method for intelligently placing an audio remote control in a standby mode, according to some embodiments.

FIG. 6 illustrates a method 600 for intelligently placing an audio remote control in a standby mode, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

For illustrative and non-limiting purposes, method 600 shall be described with reference to FIGS. 1 and 2. However, method 600 is not limited to these examples.

In 602, audio responsive electronic device 122 determines a lack of presence of user 136 at audio responsive electronic device 122 at a current time. For example, presence detector 160 of audio responsive electronic device 122 may determine a lack of presence of user 136.

In 604, audio responsive electronic device 122 determines a difference between the current time of 602 and a past time when a user was present. In some embodiments, presence detector 160 of audio responsive electronic device 122 may have determined the past time when a user was present. In some other embodiments, audio responsive electronic device 122 may have determined the past time when a user was present based on user interaction with audio responsive electronic device 122.

In 606, audio responsive electronic device 122 determines whether the difference of 604 is greater than a threshold value. In some embodiments, the threshold value may be user configured. In some other embodiments, the threshold value may be defined by audio responsive electronic device 122.

In 608, audio responsive electronic device 122 places itself in a standby mode in response to the determination that the difference of 606 is greater than the threshold value in 606. For example, audio responsive electronic device 122 may turn off one or more of microphone array 124, user interface and command module 128, transceiver 130, beam forming module 132, data storage 134, visual indicators 182, speakers 190, and processing module 184. In some embodiments, audio responsive electronic device 122 may prompt user 136 via visual indicators 182 and or speakers 190 to confirm user 136 is still intends to interact with audio responsive electronic device 122. Audio responsive electronic device 122 may place itself in standby mode if user 136 does not respond to the prompt within a period of time.

Intelligent Transmission from a Display Device to an Audio Remote Control

Figure 7:
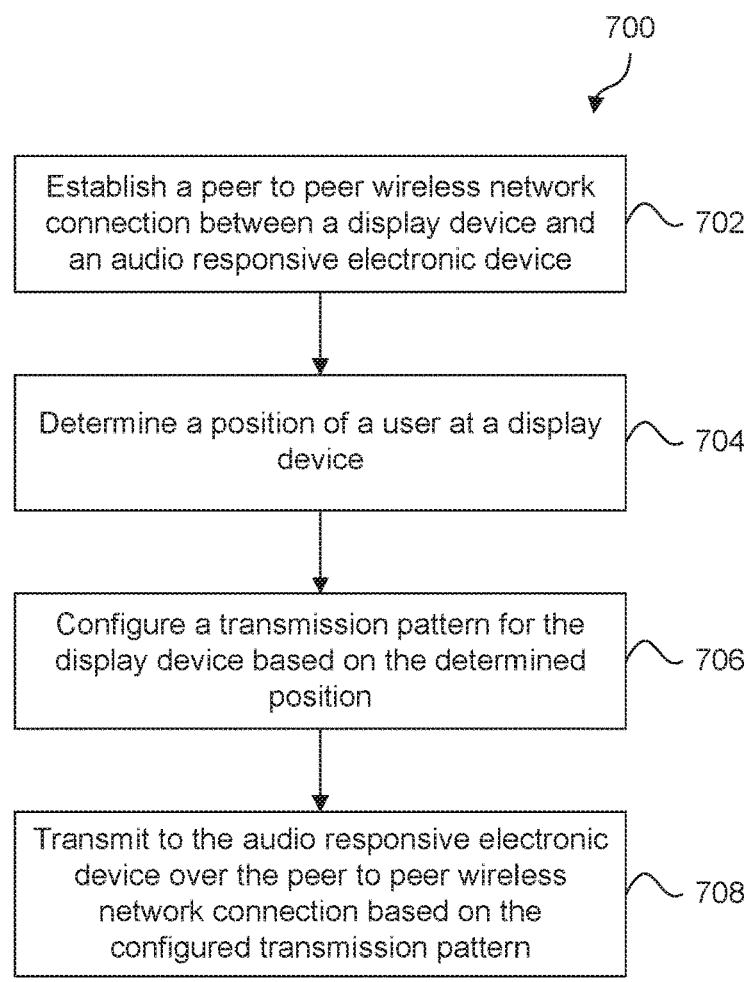
FIG. 7 illustrates a method for performing intelligent transmission from a display device to an audio remote control, according to some embodiments.

FIG. 7 illustrates a method 700 for performing intelligent transmission from a display device to an audio remote control, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

For illustrative and non-limiting purposes, method 500 shall be described with reference to FIG. 1. However, method 700 is not limited to that example.

In 702, display device 104 establishes a peer to peer wireless network connection to audio responsive electronic device 122. For example, display device 104 establishes a WiFi Direct connection to audio responsive electronic device 122. Display device 104 may transmit large amounts of data over this peer to peer wireless network connection. For example, display device 104 may stream music over this peer to peer wireless network connection. Audio responsive electronic device 122 may play the streaming music via speakers 190. Alternatively, audio responsive electronic device 122 may be communicatively coupled to a set of headphones and play the streaming music via the headphones.

In 704, display device 104 determines a position of user 136 at or proximate to display device 104. For example, presence detector 150 of display device 104 may determine a position of user 136. Display device 104 determines a position of user 136 because user 136 will likely be at the same position as audio responsive electronic device 122.

In 706, display device 104 configures a transmission pattern for the peer to peer wireless network connection based on the determined position of user 136 in 704. For example, beam forming module 170 of display device 104 may use beam forming techniques discussed herein to configure transceiver 112 to emphasize or enhance a transmission signal for the peer to peer wireless networking connection toward the determined position of user 136 in 704, e.g., the position of audio responsive electronic device 122.

In 708, display device 104 performs a transmission to audio responsive electronic device 122 over the peer to peer wireless network according to the configured transmission pattern of 706.

For example, user 136 may listen to streaming music over the peer to peer wireless network connection via a pair of headphones communicatively coupled to audio responsive electronic device 122. But streaming music involves transmitting large amounts of data at a steady rate. As a result, streaming music over a low bandwidth and or intermittent connection may result in choppy playback of the streaming music and or a loss of audio quality. Accordingly, enhancement of a transmission signal for the peer to peer wireless networking connection may increase the bandwidth of the connection and decrease connection interruptions. This may reduce choppy playback of the streaming music and or poor audio quality.

For example, display device 104 may determine the position of user 136 in a room as discussed herein. For example, display device 104 may determine that user 136 is sitting on a sofa in a specific quadrant in the room. Based on this positional information, display device 104 may use beam forming techniques discussed herein to configure transceiver 112 to enhance a transmission signal for the peer to peer wireless networking connection toward the determined position of user 136, e.g., the position of audio responsive electronic device 122. This may increase the bandwidth of the peer to peer wireless connection and decrease connection interruptions. This may further reduce choppy playback and or poor audio quality during playback of the streaming music on audio responsive electronic device 122, e.g., via a set of headphones communicatively coupled to audio responsive electronic device 122.

As would be appreciated by a person of ordinary skill in the art, display device 104 may enhance a transmission signal for the peer to peer wireless networking connection to improve the performance of various other functions of audio responsive electronic device 122 such as, but not limited to, video playback and the playing of video games. Moreover, as would be appreciated by a person of ordinary skill in the art, other devices in system 102 may be configured to enhance a transmission signal for a wireless network connection based on the detected presence or position of user 136 using presence detector 150 or presence detector 160.

Enhancing Audio Capture from A User

Figure 8:
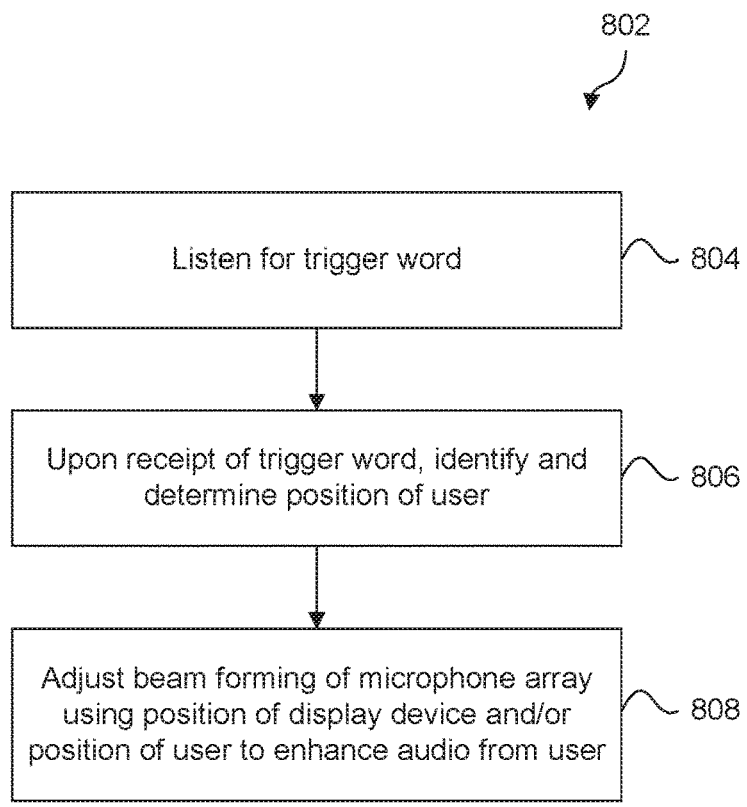
FIG. 8 illustrates a method for enhancing audio from a user, according to some embodiments.

FIG. 8 illustrates a method 802 for enhancing audio from a user, according to some embodiments. In some embodiments, method 802 is an alternative implementation of elements 306 and/or 308 in FIG. 3.

In 804, the user interface and command module 128 in the audio responsive electronic device 122 receives audio via microphone array 124, and uses well know speech recognition technology to listen for any predefined trigger word.

In 806, upon receipt of a trigger word, user interface and command module 128 determines the position of the user 136. For example, in 806, user interface and command module 128 may identify the microphones 126 where the signal amplitude (or signal strength) was the greatest during reception of the trigger word(s) (such as the back microphone 126C in the example of FIG. 2), and then operate with beam forming module 132 to adjust the reception patterns 126 of the identified microphones 126 (such as reception pattern 126C of the back microphone 126C) to enhance audio sensitivity and reception by those microphones 126. In this way, user interface and command module 128 may be able to better receive audio from user 136, to thus be able to better recognize commands in the received audio. Beam forming module 132 may perform this functionality using any well known beam forming technique, operation, process, module, apparatus, technology, etc.

In embodiments, trigger words and commands may be issued by any audio source. For example, trigger words and commands may be part of the audio track of content such that the speakers 108 of display device 104 may audibly output trigger words and audio commands as the content (received from media device 114) is played on the display device 104. In an embodiment, such audio commands may cause the media device 114 to retrieve related content from content sources 120, for playback or otherwise presentation via display device 104. In these embodiments, audio responsive electronic device 122 may detect and recognize such trigger words and audio commands in the manner described above with respect to FIGS. 3, 4, and 8, except in this case the display device 104 is the source of the commands, and the user 136 is a source of noise. Accordingly, with respect to FIG. 3, elements 302 and 304 are performed with respect to the user 136 (since in this example the user 136 is the source of noise), and elements 306 and 308 are performed with respect to the display device 104 (since in this example the display device 104 is the source of audio commands).

In some embodiments, different trigger words may be used to identify the source of commands. For example, the trigger word may be "Command" if the source of commands is the user 136. The trigger word may be "System" if the source of the commands is the display device 104 (or alternatively the trigger word may be a sound or sequence of sounds not audible to humans if the source of the commands is the display device 104). In this manner, the audio responsive electronic device 122 is able to determine which audio source to de-enhance, and which audio source to enhance. For example, if the audio responsive electronic device 122 determines the detected trigger word corresponds to the display device 104 (such that the display device 104 is the source of audio commands), then the audio responsive electronic device 122 may operate in 302 and 304 of FIG. 3 to de-enhance audio from user 136, and operate in 306 and 308 of FIG. 3 to enhance audio from the display device 104.

In embodiments, the beam forming algorithms executed by the beam forming module 132 can be simplified because the display device 104 and the user 136 are typically at stable locations relative to the audio responsive electronic device 122. That is, once initially positioned, the display device 104 and the audio responsive electronic device 122 are typically not moved, or are moved by small amounts. Also, users 136 tend to watch the display device 104 from the same locations, so their locations relative to the audio responsive electronic device 122 are also often stable.

Providing Visual Indicators from Computing Entities/ Devices that are Non-Native to an Audio Responsive Electronic Device As noted above, in some embodiments, the audio responsive electronic device 122 may communicate and operate with one or more digital assistants 180 via the network 118. A digital assistant may include a hardware front-end component and a software back-end component. The hardware component may be local to the user (located in the same room, for example), and the software component may be in the Internet cloud. Often, in operation, the hardware component receives an audible command from the user, and provides the command to the software component over a network, such as the Internet. The software component processes the command and provides a response to the hardware component, for delivery to the user (for example, the hardware component may audibly play the response to the user). In some embodiments, the digital assistants 180 shown in FIG. 1 represent the software back-end; examples include but are not limited to AMAZON ALEXA, SIRI, CORTANA, GOOGLE ASSISTANT, etc. In some embodiments, the audio responsive electronic device 122 represents the hardware front-end component. Thus, in some embodiments, the audio responsive electronic device 122 takes the place of AMAZON ECHO when operating with ALEXA, or the IPHONE when operating with SIRI, or GOOGLE HOME when operating with the GOOGLE ASSISTANT, etc.

As discussed above, AMAZON ECHO is native to ALEXA. That is, AMAZON ECHO was designed and implemented specifically for ALEXA, with knowledge of its internal structure and operation, and vice versa. Similarly, the IPHONE is native to SIRI, MICROSOFT computers are native to CORTANA, and GOOGLE HOME is native to GOOGLE ASSISTANT. Because they are native to each other, the back-end software component is able to control and cause the front-end hardware component to operate in a consistent, predictable and precise manner, because the back-end software component was implemented and operates with knowledge of the design and implementation of the front-end hardware component.

In contrast, in some embodiments, the audio responsive electronic device 122 is not native to one or more of the digital assistants 180. There is a technological challenge when hardware (such as the audio responsive electronic device 122) is being controlled by non-native software (such as digital assistants 180). The challenge results from the hardware being partially or completely a closed system from the point of view of the software. Because specifics of the hardware are not known, it is difficult or even impossible for the non-native software to control the hardware in predictable and precise ways.

Consider, for example, visual indicators 182 in the audio responsive electronic device 122. In some embodiments, visual indicators 182 are a series of light emitting diodes (LEDs), such as 5 diodes (although the visual indicators 182 can include more or less than 5 diodes). Digital assistants 180 may wish to use visual indicators 182 to provide visual feedback to (and otherwise visually communicate with) the user 136. However, because they are non-native, digital assistants 180 may not have sufficient knowledge of the technical implementation of the audio responsive electronic device 122 to enable control of the visual indicators 182 in a predictable and precise manner.

Figure 9:
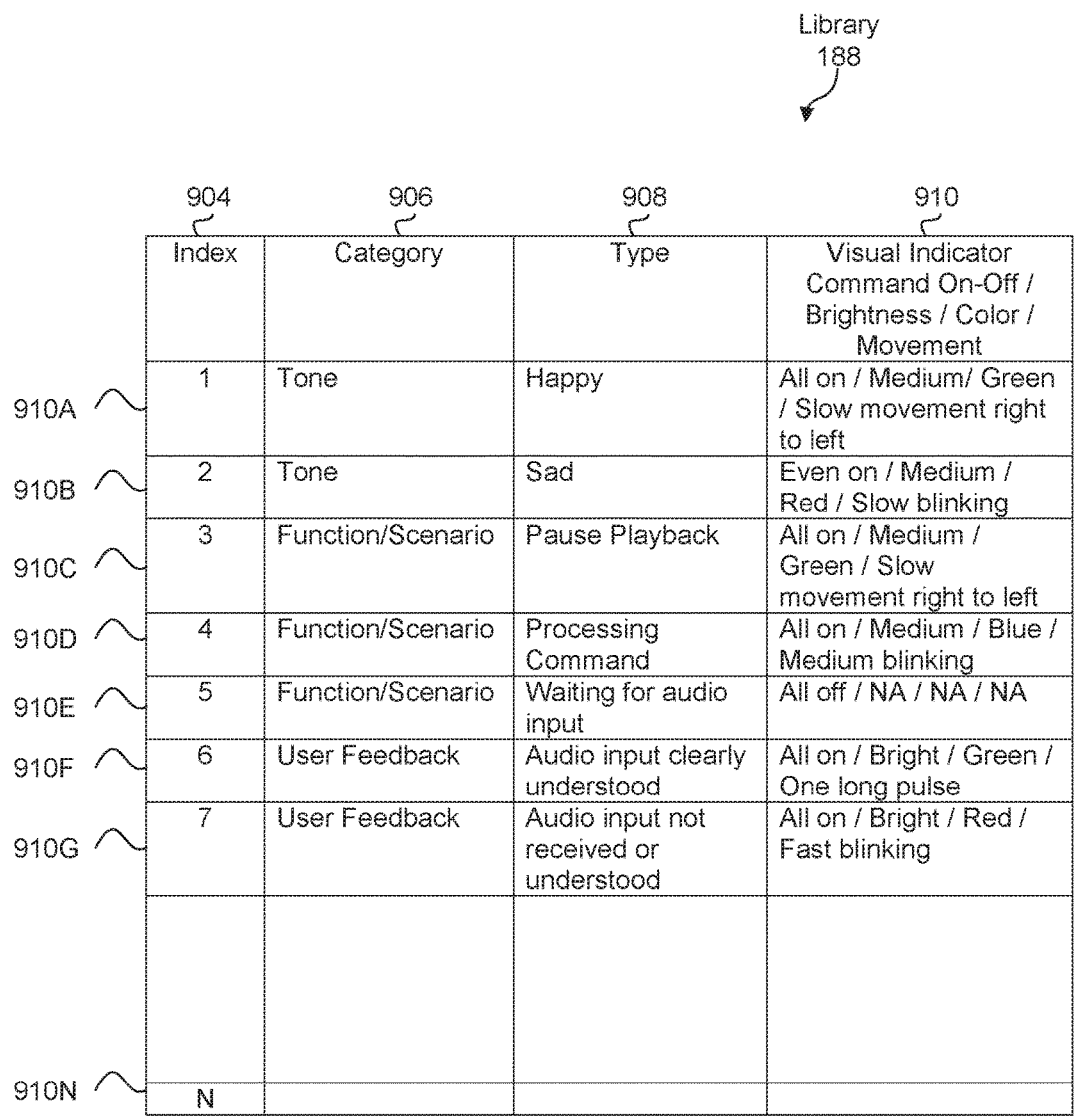
FIG. 9 illustrates an example application programming interface (API) that includes a library of example commands for controlling visual indicators of an audio responsive electronic device, according to some embodiments.

Some embodiments of this disclosure solve this technological challenge by providing a processor or processing module 184, and an interface 186 and a library 188. An example library 188 is shown in FIG. 9. In some embodiments, the library 188 and/or interface 186 represent an application programming interface (API) having commands for controlling the visual indicators 182. Native and non-native electronic devices, such as digital assistants 180, media device 114, content sources 120, display device 104, etc., may use the API of the library 188 to control the audio responsive electronic device 122 in a consistent, predictable and precise manner.

In some embodiments, the library 188 may have a row 910 for each command supported by the API. Each row 910 may include information specifying an index 904, category 906, type (or sub-category) 908, and/or visual indicator command 910. The index 904 may be an identifier of the API command associated with the respective row 910. The category 906 may specify the category of the API command. In some embodiments, there may be three categories of API commands: tone, function/scenario and user feedback. However, other embodiments may include more, less and/or different categories.

The tone category may correspond to an emotional state that a digital assistant 180 may wish to convey when sending a message to the user 136 via the audio responsive electronic device 122. The example library 188 of FIG. 9 illustrates 2 rows 910A, 910B of the tone category. The emotional state may be designated in the type field 908. According, row 910A corresponds to a "happy" emotional state, and row 910B corresponds to a "sad" emotional state. Other embodiments may include any number of tone rows corresponding to any emotions.

The function/scenario category may correspond to functions and/or scenarios wherein a digital assistant 180 may wish to convey visual feedback to the user 136 via the audio responsive electronic device 122. The example library 188 of FIG. 9 illustrates 3 rows 910C, 910D, 910E of the function/scenario category. The function/scenario may be designated in the type field 908. According, row 910C corresponds to a situation where the audio responsive electronic device 122 is pausing playback, row 910D corresponds to a situation where the audio responsive electronic device 122 is processing a command, and row 910E corresponds to a situation where the audio responsive electronic device 122 is waiting for audio input. Other embodiments may include any number of function/scenario rows corresponding to any functions and/or scenarios.

The user feedback category may correspond to situations where a digital assistant 180 or the audio responsive electronic device 122 may wish to provide feedback or information (or otherwise communicate with) the user 136. The example library 188 of FIG. 9 illustrates 2 rows 910F, 910G of the user feedback category. The user feedback situation may be designated in the type field 908. According, row 910F corresponds to a situation where a digital assistant 180 or the audio responsive electronic device 122 wishes to inform the user 136 that audio input was clearly understood. Row 910G corresponds to a situation where a digital assistant 180 or the audio responsive electronic device 122 wishes to inform the user 136 that audio input was not received or understood. Other embodiments may include any number of user feedback rows corresponding to any user feedback messages.

The library 188 may specify how the audio responsive electronic device 122 operates for the commands respectively associated with the rows 910. For example, information in the visual indicator command 910 field may specify how the visual indicators 182 in the audio responsive electronic device 122 operate for the commands respectively associated with the rows 910. While the following describes operation of the visual indicators 182, in other embodiments the library 188 may specify how other functions and/or features of the audio responsive electronic device 122 operate for the commands respectively associated with the rows 910.

In some embodiments, the visual indicator field 910 indicates: which LEDs of the visual indicators 182 are on or off, the brightness of the "on" LEDs; the color of the "on" LEDs; and/or the movement of light of the LEDs (for example, whether the "on" LEDs are blinking, flashing from one side to the other, etc.). For example, for row 910A, corresponding to the "happy" tone, all the LEDs are on with medium brightness, the color is green, and the LEDs are turned on to simulate slow movement from right to left. For row 910D, corresponding to the "processing command" function/scenario, all the LEDs are on with medium brightness, the color is blue, and the LEDs are blinking at medium speed. For row 910E, corresponding to the "waiting for audio input" function/scenario, all the LEDs are off. For row 910G, corresponding to the "audio input not received or understood" user feedback category, all the LEDs are on with high brightness, the color is red, and the LEDs are blinking at high speed. These settings in the visual indicator command field 910 are provided for illustrative purposes only and are not limiting. These settings in the visual indicator command field 910 can be any user-defined settings.

Figure 10:
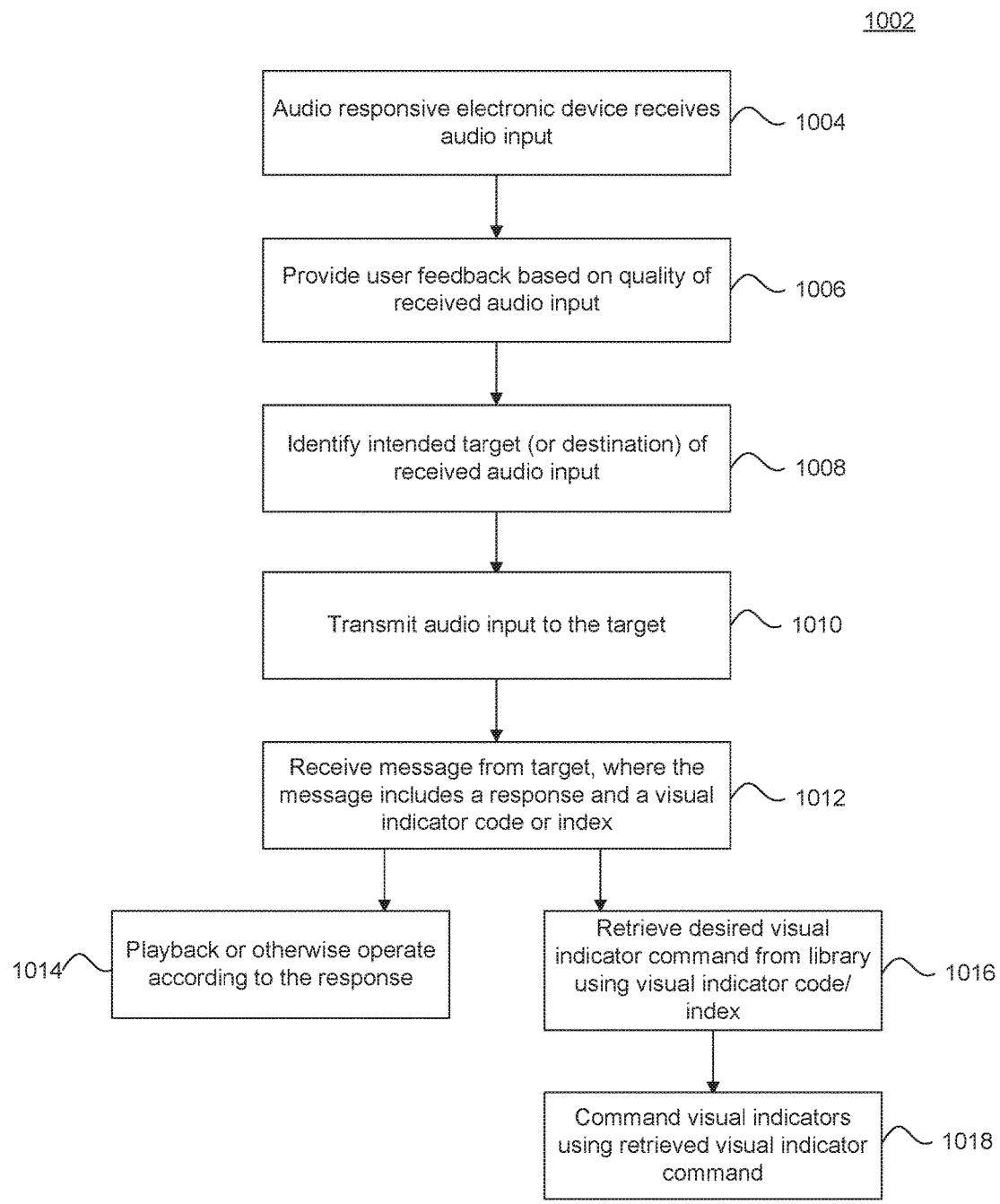
FIG. 10 illustrates a method in an audio responsive electronic device for providing to users visual indicators from computing entities/devices that are non-native to the audio responsive electronic device, according to some embodiments.

FIG. 10 illustrates a method 1002 in the audio responsive electronic device 122 for predictably and precisely providing users 136 with visual information from computing entities/devices, such as but not limited to digital assistants 180, media device 114, content sources 120, display device 104, etc. Such computing entities/devices may be native or non-native to the audio responsive electronic device 122. Accordingly, embodiments of this disclosure overcome the technical challenge of enabling a first computing device to predictably and precisely interact with and control a second computing device, when the first computer device is not native to the second computing device.

Method 1002 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

For illustrative and non-limiting purposes, method 1002 shall be described with reference to FIGS. 1 and 9. However, method 1002 is not limited to those examples.

In 1004, the audio responsive electronic device 122 receives audio input from user 136 or another source, such as from speakers 108 of display device 106. The microphone array 124 of the audio responsive electronic device 122 receives such audio input. For example, user 136 may say "When does the new season of GAME OF THRONES start?"

In 1006, the audio responsive electronic device 122 determines if the audio input was properly received and understood. The audio input may not have been properly received if the user 136 was speaking in a low voice, if there was noise from other sources (such as from other users or the display device 104), or any number of other reasons. The audio responsive electronic device 122 may use well known speech recognition technology to assist in determining whether the audio input was properly received and understood in step 1006.

In some embodiments, in step 1006, the audio responsive electronic device 122 may use the library 188 to provide visual feedback to the user 136 as to whether the audio input was properly received and understood. For example, the audio responsive electronic device 122 may send index 6 to the interface 186 of processor 184 when the audio input was properly received and understood. Processor 184 may access the library 188 using Index 6 to retrieve the information from row 910F, which corresponds to the "audio input clearly understood" user feedback command. The processor 184 may use the visual indicator command field 910 of the retrieved row 910F to cause the LEDs of the visual indicators 182 to be one long bright green pulse.

As another example, the audio responsive electronic device 122 may send Index 7 to the interface 186 of processor 184 when the audio input was not properly received and understood. Processor 184 may access the library 188 using Index 7 to retrieve the information from row 910G, which corresponds to the "audio input not received or understood" user feedback command. The processor 184 may use the visual indicator command field 910 of the retrieved row 910G to cause the LEDs of the visual indicators 182 to be all on, bright red, and fast blinking.

If, in 1006, the audio responsive electronic device 122 determined the audio input was properly received and understood, then in 1008 the audio responsive electronic device 122 analyzes the audio input to identify the intended target (or destination) of the audio input. For example, the audio responsive electronic device 122 may analyze the audio input to identify keywords or trigger words in the audio input, such as "HEY SIRI" (indicating the intended target is SIRI), "HEY GOOGLE" (indicating the intended target is the GOOGLE ASSISTANT), or "HEY ROKU" (indicating the intended target is the media device 114).

In 1010, the audio responsive electronic device 122 transmits the audio input to the intended target identified in 1008, via the network 118. The intended target processes the audio input and sends a reply message to the audio responsive electronic device 122 over the network. In some embodiments, the reply message may include (1) a response, and (2) a visual indicator index.

For example, assume the intended target is SIRI and the audio input from step 1004 is "When does the new season of GAME OF THRONES start?" If SIRI is not able to find an answer to the query, then the reply message from SIRI may be:
(1) Response: "I don't know"
(2) Visual Indicator Index: 2

If SIRI is able to find an answer to the query, then the reply message from SIRI may be:
(1) Response: "Soon"
(2) Visual Indicator Index: 1

In 1014, the audio responsive electronic device 122 processes the response received in step 1012. The response may be a message to audibly playback to the user 136 via speakers 190, or may be commands the audio responsive electronic device 122 is instructed to perform (such as commands to control the media device 114, the display device 104, etc.). In the above examples, the audio responsive electronic device 122 may play over speakers 190 "I don't know" or "Soon."

Steps 1016 and 1018 are performed at the same time as step 1014, in some embodiments. In 1016, the interface 186 of the audio responsive electronic device 122 uses the visual indicator index (received in 1012) to access and retrieved information from a row 910 in the library 188. The processor 184 or interface 186 uses information in the visual indicator command field 910 of the retrieved row 910 to configure the visual indicators 182.

In the above examples, when the received response is "I don't know" and the received visual indicator index is 2, the processor 184 or interface 186 causes every other LED of the visual indicators 182 to be on, red with medium intensity, slowly blinking. When the received response is "Soon" and the received visual indicator index is 1, the processor 184 or interface 186 causes all the LEDs of the visual indicators 182 to be on, green with medium intensity, configured to simulate slow movement from right to left.

The above operation of the audio responsive electronic device 122, and the control and operation of the visual indicators 182, referenced SIRI as the intended digital assistant 180 for illustrative purposes only. It should be understood, however, that the audio responsive electronic device 122 and the visual indicators 182 would operate in the same predictable and precise way for any other digital assistant 180, display device 104, media device 114, etc., whether native or non-native to the audio responsive electronic device 122.

Example Computer System

Figure 11:
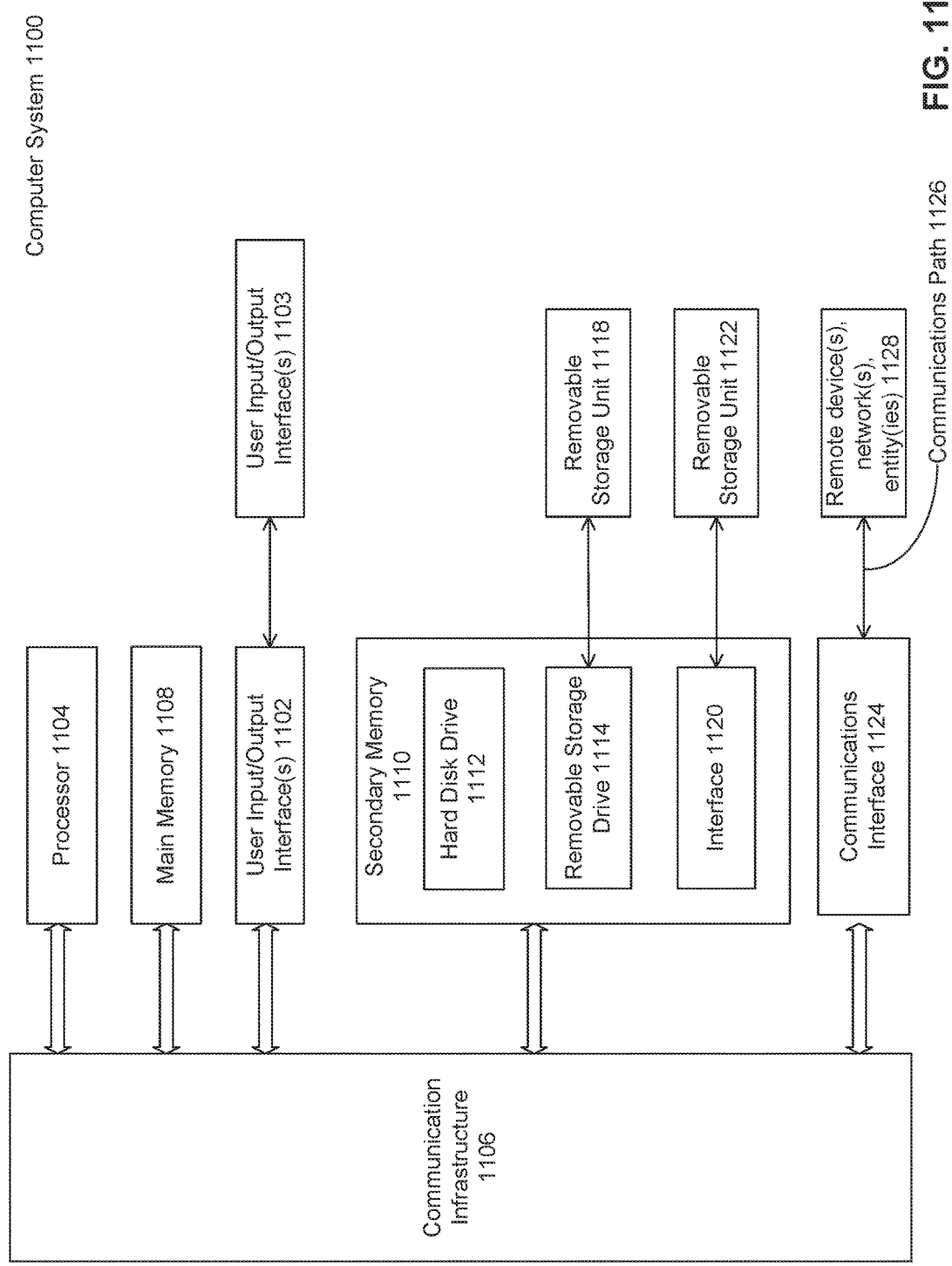
FIG. 11 is an example computer system useful for implementing various embodiments.

Various embodiments and/or components therein can be implemented, for example, using one or more computer systems, such as computer system 1100 shown in FIG. 11. Computer system 1100 can be any computer or computing device capable of performing the functions described herein. For example, one or more computer systems 1100 can be used to implement the operations of FIGS. 3-8.

Computer system 1100 includes one or more processors (also called central processing units, or CPUs), such as a processor 1104. Processor 1104 is connected to a communication infrastructure or bus 1106.

One or more processors 1104 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102.

Computer system 1100 also includes a main or primary memory 1108, such as random access memory (RAM). Main memory 1108 can include one or more levels of cache. Main memory 1108 has stored therein control logic (i.e., computer software) and/or data.

Computer system 1100 can also include one or more secondary storage devices or memory 1110. Secondary memory 1110 can include, for example, a hard disk drive 1112 and/or a removable storage device or drive 1114. Removable storage drive 1114 can be a floppy disk drive, a magnetic tape drive, a compact disk drive, an optical storage device, tape backup device, and/or any other storage device/drive.

Removable storage drive 1114 can interact with a removable storage unit 1118. Removable storage unit 1118 includes a computer usable or readable storage device having stored thereon computer software (control logic) and/or data. Removable storage unit 1118 can be a floppy disk, magnetic tape, compact disk, DVD, optical storage disk, and/any other computer data storage device. Removable storage drive 1114 reads from and/or writes to removable storage unit 1118 in a well-known manner.

According to an exemplary embodiment, secondary memory 1110 can include other means, instrumentalities or other approaches for allowing computer programs and/or other instructions and/or data to be accessed by computer system 1100. Such means, instrumentalities or other approaches can include, for example, a removable storage unit 1122 and an interface 1120. Examples of the removable storage unit 1122 and the interface 1120 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 can further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 can allow computer system 1100 to communicate with remote devices 1128 over communications path 1126, which can be wired and/or wireless, and which can include any combination of LANs, WANs, the Internet, etc. Control logic and/or data can be transmitted to and from computer system 1100 via communication path 1126.

In some embodiments, a tangible apparatus or article of manufacture comprising a tangible computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An audio responsive electronic device, comprising:
a presence detector configured to detect a presence of a user within a threshold distance of the audio responsive electronic device;
a network interface;
a microphone; and
a processor configured to:
place the network interface and the microphone in a power on state in response to the presence detector detecting the user being in a room quadrant of a plurality of room quadrants; and
place the network interface and the microphone in a power off state in response to the presence detector detecting a lack of presence of the user for a duration of time greater than a threshold temporal value.

2. The audio responsive electronic device of claim 1, wherein the presence detector comprises a motion sensor configured to detect a motion of the user based on an interaction of radio waves of an Institute of Electrical and Electronics Engineers (IEEE) 802.11 standard with the user.

3. The audio responsive electronic device of claim 1, wherein the processor is further configured to establish a peer to peer wireless network connection using the network interface upon placing the network interface in the power on state.

4. The audio responsive electronic device of claim 1, wherein to place the network interface and the microphone in a power off state, the processor is further configured to:
detect the lack of presence of the user via the presence detector at a current time;
determine a difference between a value associated with the current time and a value associated with a past time of a past user presence detection;
determine the difference is greater than the threshold temporal value; and
place the network interface and the microphone in a power off state in response to the difference being greater than the threshold temporal value.

5. The audio responsive electronic device of claim 2, wherein the processor is further configured to place the network interface and the microphone in the power on state in response to the presence detector detecting the presence of the user within the threshold distance of the audio responsive electronic device.

6. The audio responsive electronic device of claim 3, wherein the processor is further configured to transmit a keep alive message over the peer to peer wireless network connection in response the presence detector detecting the presence of the user within the threshold distance of the audio responsive electronic device.

7. The audio responsive electronic device of claim 4, wherein the processor is further configured to output a prompt for the user to confirm placing the network interface and the microphone in a power off state in response to the difference being greater than the threshold temporal value.

8. An audio responsive electronic device, comprising:
a presence detector configured to detect a position of a user;
a microphone; and
a processor configured to:
determine the user is in a room quadrant among a plurality of room quadrants using the presence detector; and
adjust a reception pattern for the microphone based on the room quadrant.

9. The audio responsive electronic device of claim 8, wherein the processor is further configured to:
adjust the reception pattern for the microphone based on beam forming techniques.

10. The audio responsive electronic device of claim 8, wherein the processor is further configured to:
receive audio input using the microphone; and
perform noise cancellation on the audio input based on the room quadrant.

11. The audio responsive electronic device of claim 8, wherein the processor is further configured to place the microphone in a power off state based on the room quadrant.

12. The audio responsive electronic device of claim 8, further comprising an additional microphone, and wherein the processor is further configured to place the additional microphone in a power on state based on the room quadrant.

13. The audio responsive electronic device of claim 8, wherein the processor is further configured to:
determine the user is within a threshold distance of the audio responsive electronic device using the presence detector; and
adjust the reception pattern of the microphone based on the user being within the threshold distance.

14. The audio responsive electronic device of claim 8, wherein the processor is further configured to:
determine a position of a display device; and
adjust the reception pattern of the microphone based on the position of the display device.

15. A system, comprising:
a network;
a display device;

one or more content sources communicatively coupled to the network;

a remote control communicatively coupled to the network; and a media device communicatively coupled to the display device and the network, comprising a presence detector, wherein the media device is configured to:

detect a position of a user using the presence detector; and adjust a transmission pattern to the remote control based on the detected position of the user.

16. The system of claim 15, wherein the presence detector comprises a motion detector.

17. The system of claim 15, wherein the processor is further configured to adjust the transmission pattern to the remote control based on beam forming techniques.

18. The system of claim 15, wherein the processor is further configured to:

determine the user is in a room quadrant among a plurality of room quadrants; and adjust the transmission pattern to the remote control based on the room quadrant.

* * * * *